United States Patent [19]

Brady et al.

[11] 3,989,797
[45] Nov. 2, 1976

[54] PROCESS FOR REMOVING SULFUR OXIDES FROM GAS STREAMS

[75] Inventors: Jack D. Brady; Lester K. Legatski, both of Wheaton, Ill.

[73] Assignee: FMC Corporation, New York, N.Y.

[22] Filed: Mar. 15, 1974

[21] Appl. No.: 451,643

[52] U.S. Cl. ............................. 423/242; 423/512 R
[51] Int. Cl.² ..................................... C01B 17/00
[58] Field of Search ........... 423/242, 243, 244, 512; 23/304

[56] References Cited
UNITED STATES PATENTS

| | | | |
|---|---|---|---|
| 3,775,532 | 11/1973 | Shah | 423/242 |
| 3,825,656 | 7/1974 | Murakami et al. | 423/512 |
| 3,911,084 | 10/1975 | Wall et al. | 423/242 |

*Primary Examiner*—Earl C. Thomas
*Assistant Examiner*—Gregory A. Heller
*Attorney, Agent, or Firm*—Dressler, Goldsmith, Clement, Gordon & Shore, Ltd.

[57] ABSTRACT

In a system for removing sulfur oxides from flue gas, the gas is contacted by a primary extraction solution containing sodium sulfite as the active compound and some sodium bisulfite in a scrubber, and the resultant extract containing more sodium bisulfite is mixed with an alkaline solution containing regenerated sodium sulfite in a mixer to produce the primary extraction solution. A portion of the latter is bled off to a regenerator wherein the quantity of sodium bisulfite made in the scrubber reacts with calcium hydroxide to form regenerated sodium sulfite and large diameter calcium sulfite precipitates that remain suspended in the parent solution. This mixture is drawn off the regenerator by overflow, without pumping, for gravity flow to the eye of a thickener, wherein an increased density slurry of the mixture is withdrawn from the thickener well and directed to a rotary filter to produce a calcium sulfite filter cake. The resultant filtrate and the solids free overflow from the thickener provide the sodium sulfite solution inputs to a holding tank, from which the liquor is pumped through a back washed polishing filter and back to the mixer. Flyash, initially present in the incoming flue gas, is separated from the gas in the scrubber and passes through the system to the filter, where it acts as a filter-aid.

5 Claims, 2 Drawing Figures

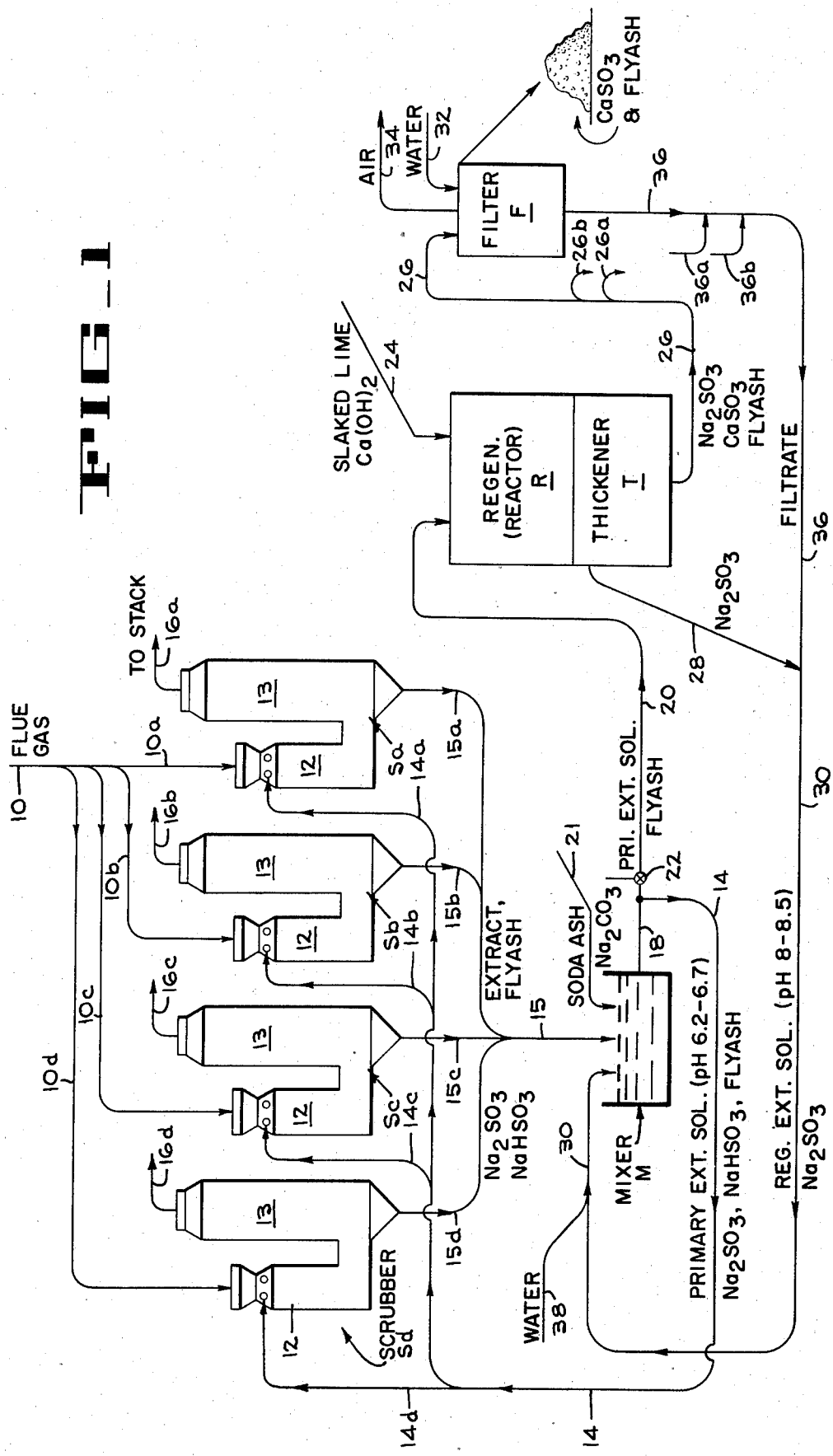
FIG_1

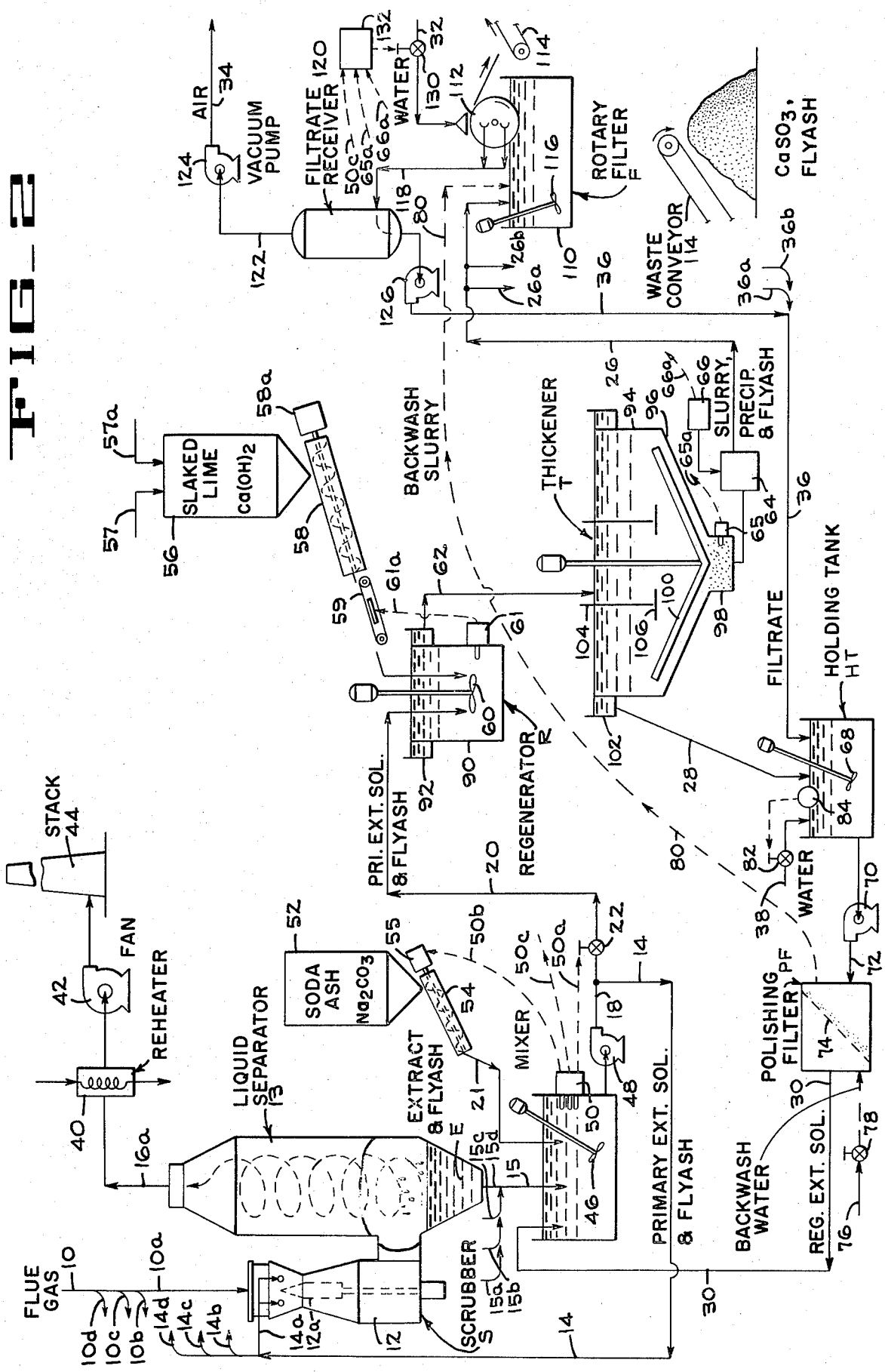

PROCESS FOR REMOVING SULFUR OXIDES FROM GAS STREAMS

FIELD OF THE INVENTION

This invention relates to a process for removing sulfur oxides and particularly sulfur dioxide from gas streams such as a flue gas source from a power plant or the like or from other process sources. The invention also relates to the process described above wherein the gas stream or flue gases include particulate particles such as flyash.

DESCRIPTION OF PRIOR ART

The United States patent to Shah U.S. Pat. No. 3,542,511, Nov. 24, 1970, discloses a system for removal of sulfur dioxide from waste gases. In this patent, the flue gases containing sulfur dioxide and flyash enter a scrubber into which is introduced an aqueous solution of sodium bisulfite and sodium sulfite. The resultant reaction with the sulfur dioxide increases the proportion of the sodium bisulfite and this solution, plus the residual sodium sulfite and flyash, are removed from the scrubber as an extract. Part of the extract (sodium bisulfite and sodium sulfite) is bled from the discharge of the scrubber, and mixed with a solution of sodium carbonate which converts some of the sodium bisulfite to sodium sulfite, and the solution is recycled through the scrubber. The remainder of the extract from the scrubber enters a flyash removal device, and the filtrate of sodium sulfite and sodium bisulfite solution is combined with a bleed off stream of the sodium carbonate solution in a reactor to produce a concentrated solution of sodium sulfite. The latter is reduced with a reducing gas in a furnace to produce sodium sulfide solution which is mixed with water and directed to a carbonator. Here, carbon dioxide reacts with the sodium sulfide solution to provide the sodium carbonate solution previously referred to for reaction with the sodium bisulfite, along with hydrogen sulfide, which is converted to elemental sulfur.

SUMMARY OF THE INVENTION

The present invention is an improvement in the process of United States application to Wall et al., Ser. No. 333,993, filed Feb. 20, 1973 and assigned to the FMC Corporation, now U.S. Pat. No. 3,911,084.

Briefly, the process of the present invention is a process for removing sulfur oxides from a gas stream, such as that emanating from steam powered electric generating plants, industrial plants burning sulfur bearing fuels, industrial or chemical operations which produce sulfur oxide containing flue gas, etc. Although the system of the present invention is designed primarily for sulfur dioxide removal, sulfur trioxide can also be absorbed and removed from the gas stream, along with dust, flyash and other particles. The system to be described incorporates basic principles of the Wall et al process, but the system of the present invention also includes improved features, as will be indicated as the following description of the system proceeds.

The process comprises the steps of employing a contactor (such as a gas-liquid scrubber) for dissolving the sulfur oxides (principally sulfur dioxide) of the incoming contaminated or flue gas stream in a major portion of a slightly acid, primary extraction solution containing both sodium sulfite, sodium bisulfite, (which is included to render the solution somewhat acidic) and some sodium sulfate.

The scrubber employs a reaction of sulfur dioxide with sodium sulfite in the primary extraction solution or scrubbing liquor. This reaction converts some sodium sulfite to sodium bisulfite (acid) to produce an extract. Since the extraction solution acts most efficiently in the scrubber if it is slightly acid, some sodium bisulfite is initially included in that solution. Liquid free gas is exhausted from the scrubber and the extract flows to a recirculation tank or mixer.

It is desired to reuse or recirculate the slightly acid extract liquor from the recirculation or mixer tank in order to conserve the sodium salts involved in the loop. Since sodium sulfite is the active chemical in the scrubber and since some sodium sulfite is depleted from the primary extraction solution by the reaction in the scrubber, a portion of the liquid in the mixer or recirculation tank, (which portion contains an amount of sodium bisulfite equal to that made in the scrubber), is diverted to a regeneration system where the sodium bisulfite in the diverted liquid is reacted with a calcium oxide, preferably calcium hydroxide. This regenerates the incoming sodium bisulfite to sodium sulfite and the regenerated liquid is ultimately returned to the mixer tank. The liquid in the regenerator is alkaline. Also, in the regeneration action an insoluble precipitate of calcium sulfite is formed which is ultimately filtered out, but some of the parent liquor is dragged out with the precipitate.

Some sodium salts, including the active sodium sulfite, are continuously lost along with the waste solids filtered from the liquor, so that sodium sulfite must be replenished in the loop of the system.

The preferred chemical for replacement of lost sodium sulfite is sodium carbonate which will react with sodium bisulfite to form sodium sulfite. Sodium carbonate is added to the loop at a zone where the liquid is acidic, as in the mixer tank, so that the carbon dioxide formed in the reaction bubbles off and does not remain dissolved in the mixer tank solution or in the scrubbing or extraction liquid withdrawn therefrom. This prevents formation of calcium carbonate in the mixer which might take place if any trace of calcium were present in the scrubbing solution returned to the mixer tank. It is important not to introduce calcium salts to the scrubber from the mixer because they form scale in that apparatus.

In the Wall et al. system, the mixture of sodium salts and calcium sulfite precipitate formed in the regeneration system is pumped directly to a rotary filter, to produce a moist filter cake of calcium sulfite precipitate (waste solids) and a clear filtrate containing sodium sulfite, (and some sodium sulfate). Under the present invention, the aforesaid mixture from the regenerator is not sent directly to the filter but rather is delivered to a thickener and slurry from the thickener is pumped to the rotary filter.

Another feature of the present invention relates to the aforesaid action that takes place in the regenerator system. As mentioned, calcium oxide values are introduced into a regenerator or reactor unit of the regeneration system in the form of calcium hydroxide. The calcium hydroxide is reacted with the sodium bisulfite in the aforesaid bleed-off portion of the primary extraction solution to convert sodium bisulfite (acid) to sodium sulfite (alkaline) and to thus provide an alkaline regenerated extraction solution containing regenerated sodium sulfite for mixing with the extract from the scrubber. In the regenerator, the calcium hydroxide reaction with the acid sodium bisulfite also forms the aforesaid insoluble precipitate of calcium sulfite.

It is an object of the present invention to provide complete removal of the calcium sulfite precipitate from the mother liquor, because it is important that calcium salts not be returned to the scrubber during extraction liquor recirculation. Although both calcium oxide or calcium hydroxide reactions are described in the aforesaid Wall et al application, it is now known that the calcium hydroxide is the preferred chemical. Also, the calcium sulfite will agglomerate or flocculate into large "fluffy" particles under proper conditions of sodium salt concentration and if the pH in the regenerator exceeds 7.9. Otherwise, the precipitate may comprise very fine particles which are difficult to filter. Furthermore, even if attempts were made to concentrate these small particles prior to filtering, as by gravity separation in a settling tank, the settling process would be slow and would require very large size settling tanks or thickeners to maintain the required throughput.

Under the present invention, the large flocculates of calcium sulfite are presented as such to the thickener, where they will rapidly settle out by gravity separation and will form a slurry of increased density that is easily filtered. There is no need for excessively large settling tanks or thickeners at this stage.

More specifically, it has been found that the mere passing of a solution containing these large "fluffy" flocculates of calcium sulfite precipitate through a device that agitates them, such as a pump, before introducing them to a settling tank or thickener has the effect of breaking the flocculates back into small size particles, making it both a difficult and tedious process to separate the particles from the parent solution.

Under the present invention, the mixture of large calcium sulfite flocculates suspended in the parent solution is gently withdrawn as overflow from the top of the regenerator by gravity flow alone and is thus directed to a thickener. No agitators or pumps are interposed in the line between the regenerator overflow and the thickener. By using these techniques the large size calcium sulfite flocculates that form in the regenerator can be directed to and will rapidly settle out as a concentrated slurry in the thickener.

It has been further found, that once formed, this increased density slurry of calcium sulfite flocculate and sodium salt solution can be pumped as underflow from the thickener to a filter without deleterious effects on the subsequent formation of the filter cake.

Another feature of the invention is that precipitate free solution, containing regenerated sodium sulfite (which is alkaline) can be removed as an overflow from the thickener and utilized as a solids-free source of regenerated solution for subsequent mixing with the acidic extract withdrawn from the scrubber.

Another feature of the present invention relates to the employment of flyash as a readily available, low cost filter-aid in the formation of the calcium sulfite filter cake. In many systems flyash is present in the flue gas entering the scrubber, unless it is removed by a cyclone, precipitator or similar device before entering the scrubber. Under the present invention, if flyash is present in the incoming flue gas, the flyash is permitted to enter the scrubber along with the gas stream. The flyash is separated from the gas stream by the scrubber liquid and hence is withdrawn from the scrubber along with the extract that contains sodium sulfate, sodium sulfite and an increased amount of sodium bisulfite, as previously described. The entrained flyash enters and is withdrawn from the mixer, and is passed on to the regenerator where it agglomerates with the calcium sulfite precipitate and hence is withdrawn as regenerator underflow along with the precipitate. The flyash thus enters the thickener, is withdrawn with the thickener underflow, and is pumped to the rotary filter along with the concentrated calcium sulfite slurry. It has been found that by passing the flyash through the system as described, the use of separate filter-aids such as diatomaceous earth or the like is not necessary to produce a good, easily dewatered filter cake containing the calcium sulfite flocculate.

Thus, in accordance with the present invention, where flue gas entering the contactor or scrubber contains flyash, the system is operated without use of a mechanical or electrostatic precipitator in the gas stream, or at least if these units are present in the system, they should be operated in a manner which gives an adequate inlet loading of flyash to the sulfur dioxide containing gas stream entering the scrubber. In fact if precipitation units are employed in the flue gas system to remove flyash, or if no flyash is present in the contaminated gas stream, it is beneficial to blend flyash into the regenerator to enhance the flocculation action as well as to improve the action of the filter.

Another feature of the invention relates to safety precautions embodied in the filtering system. The main filter is a rotary drum type employing a fabric cloth screen partially immersed in the influent slurry. Clear filtrate is sucked through the filter cloth into a filtrate receiver tank connected to a vacuum pump. The moist waste solids (calcium sulfite and flyash along with some liquor) are scraped from the filter drum and diverted to a disposal conveyor. The air-free filtrate is pumped to a return liquid holding tank, where it is mixed with the thickener overflow for return to the mixer.

In case the fabric screen on the rotary filter drum passes solids or is ruptured, calcium bearing solids would be pumped to the holding tank along with the normally clear filtrate. These solids could be returned to the scrubber, via the mixer, where they might cause scale formation, as in the case of prior scrubbing processes that actually employ suspended calcium salts in the scrubbing loop. Accordingly, filtrate from the return liquid holding tank is pumped through a polishing filter en route to the mixer. Also, the holding tank contains an agitator to prevent any solids present from separating out.

The polishing filter is also a fabric type filter and removes solids until it becomes plugged and liquid cannot be pumped through it. When this occurs, a backwash system is operated to wash the polishing filter screen with water and return the backwash slurry to the rotary filter influent tank. Here the backwash solids are removed by the rotary filter screen (repaired if necessary) and disposed of with the waste solids.

Still another feature of the invention relates to sodium salt depletion. Sodium salts are dragged out with the waste solids at the filter. The ratio of sodium sulfate/sodium sulfite (the active chemical) is kept high, so that the amount of sodium sulfite dragged out is correspondingly small and is made up by the controlled admission of soda ash to the mixer tank. Since sodium sulfite is readily oxidized, some sulfite is oxidized to sulfate in the scrubber so that the sulfate content of the liquid would ordinarily increase steadily. However, under the present invention, the amount of sulfate added to the loop by oxidation represents the amount of sodium sulfate rejected at the filter. The latter amount is controlled by a filter drum wash back system under control of instrumentation.

BRIEF DESCRIPTION OF THE DRAWINGS

FIG. 1 is a diagramatic flow sheet illustrating the basic process of the present invention.

FIG. 2 is a more detailed flow sheet, showing features not illustrated in FIG. 1.

BRIEF DESCRIPTION OF THE BASIC PROCESS

This process can be utilized for removal of sulfur oxides and flue gas from steam-electric generating plants and industrial steam plants burning coal, oil, or other fuels that contain sulfur. It can also be used for removal of sulfuric acid production and from other chemical operations which generate sulfur oxides as end products or as by products in the flue gas. Although the process is designed primarily for sulfur dioxide, sulfur trioxide can also be absorbed and removed from the gas stream. The process can be used in conjunction with dust collection equipment already installed in these gas sources or it can be used to recover dust, flyash and other particulate matter from the gas streams emanating from such sources.

FIG. 1 is a simplified schematic diagram of the basic process of the present invention as applied to a sample installation, wherein the contaminated gas, such as flue gas, is directed to four scrubbers connected in parallel to the scrubbing system. The number of scrubbers utilized in a given system is merely a matter of design and hence for purposes of explanation reference can be made to a single scrubber.

FIG. 1 can be considered to represent an example of an installation for treating flue gas from a large industrial source such as a coal-fired steam generating plant which produces both flyash and sulfur dioxide in the flue gas. The sulfur-oxide contaminated gas stream enters at line 10 and since in the example shown, four scrubbers Sa-Sd are actually employed, the gas inlet line 10 has branch lines 10a-10d. In each scrubber the contaminated gas stream is contacted with a scrubbing or primary extraction solution containing sodium sulfite, sodium bisulfite and sodium sulfate, and under the present invention this solution also contains suspended flyash and other particulate matter which was previously removed from the incoming gas stream. Since this basic description is primarily concerned with chemical features, reference to the handling of flyash is cursory in this basic description.

Sulfur dioxide is removed in each scrubber by contact with a primary extraction solution entering by line 14 and having branch lines 14a-14d for the various scrubbers. Sodium sulfate (Na₂SO₄) is also dissolved in the various solutions but since it does not enter into the basic reactions, details relating thereto will be referred to later in a more detailed description.

In the scrubbers, sulfur dioxide is absorbed into the scrubbing liquor entering from line 14 by a reaction in a venturi unit 12 with the sodium sulfite and water to form sodium bisulfite. The reaction takes place as follows:

$$SO_2 + H_2O + Na_2SO_3 \rightarrow 2NaHSO_3 \qquad (1)$$

The liquid is separated from the gas in a cyclone separator 13 associated with each scrubber and the liquid-free, sulfur oxide depleted gas stream is exhausted from each scrubber and sent to a stack for each scrubber by lines 16a-16d. The resultant liquid extract is drawn by gravity from the scrubbers by individual lines 15a-15d and directed by gravity to a mixer or recirculation tank M by a line 15.

The primary extraction solution entering the scrubbers from line 14 has a pH of about 6.2-6.7, but since the reaction (1) increases the amount of sodium bisulfite, the extract in line 15 will be more acidic. However, enough scrubbing liquid is pumped to the scrubber so that the quantity of sodium sulfite available is adequate to prevent any significant increase in acidity.

Sodium bisulfite is produced at the expense of sodium sulfite in the scrubbers, and since sodium sulfite is the active chemical, it should not be depleted. Thus, some of the liquid from the mixer M is directed to a regeneration system that includes a regenerator or reactor R, wherein the sodium bisulfite made in the scrubbers is regenerated to sodium sulfite before the liquid is returned to the mixer tank M for recirculation. This is accomplished by dividing the primary extraction solution delivery line 18 from the mixer M into a main or scrubber branch 14 and by bleeding off a controlled amount of the solution via a line 20 to the regenerator or reactor R, under control of a valve 22.

Some sodium salts, including sodium sulfite, the active chemical in the scrubbing process, are flushed out of the system along with waste solids in a downstream filter F, to be described presently, and hence are continuously lost in the waste solids. Accordingly, an inexpensive sodium salt is added to the system to provide a reaction that replenishes the sodium value lost at the filter. An active but inexpensive sodium chemical such as sodium carbonate (soda ash) or sodium hydroxide (caustic soda) is added to the system to provide for sodium sulfite replenishment. Because of the ease of handling, sodium carbonate is the preferred makeup material. Thus, soda ash is added to the mixer M by means of a line 21, the reaction being as follows:

$$\text{Soda Ash: } Na_2CO_3 + 2NaHSO_3 \rightarrow 2Na_2SO_3 + CO_2\uparrow + H_2O \qquad (2)$$

If caustic soda were employed, we would have the following reaction:

$$\text{Caustic Soda: } NaOH + NaHSO_3 \rightarrow Na_2SO_3 + H_2O \qquad (3)$$

It is important that the sodium carbonate (soda ash) be added to an acid solution, such as the solution in the mixer M having a pH of about 6-7. Under these conditions, the carbon dioxide bubbles off from the solution (as in reaction 2) and the carbonate does not remain dissolved in the solution. This prevents formation of calcium carbonate if any trace of calcium is present in the solution and hence further reduces a tendency to form scale when the solution is introduced into the scrubber.

As mentioned, a controlled amount of the primary extraction solution (including flyash) is bled off in the line 20 under the control of the valve 22 and directed to the regenerator or reactor R. This liquid contains sodium sulfite, sodium bisulfite and sodium sulfate. However, because sodium bisulfite was produced in the scrubber at the expense of sodium sulfite in the primary extraction solution from the line 14, the sodium bisulfite from the line 20 is regenerated to sodium sulfite for return to the mixer M and on back to the scrubbers. This regeneration is accomplished in the regenerator or reactor R by the addition of hydrated or slaked lime, $Ca(OH)_2$, from a line 24 to the liquor entering the regenerator from line 20. A two step reaction takes place in the regenerator R, which precipitates calcium sulfite for disposal as a waste solid and regenerates sodium sulfite for ultimate reuse in the scrubber extraction solution. The two-step reaction is as follows:

$$Ca(OH)_2 + Na_2SO_3 \rightarrow CaSO_3 + 2NaOH \qquad (4)$$

$$2NaOH + 2NaHSO_3 \rightarrow 2Na_2SO_3 + 2H_2O \qquad (5)$$

Combining reactions (4) and (5) we have:

$$Ca(OH)_2 + 2NaHSO_3 \rightarrow CaSO_3 + Na_2SO_3 + 2H_2O \qquad (6)$$

The control valve 22 is adjusted so that the liquid in line 20, directed to the regenerator R, contains an amount of sodium bisulfite $NaHSO_3$ equal to that produced by the reaction in the scrubbers. In the regenerator R, an insoluble precipitate of calcium sulfite is formed and liquid from the regenerator mixed with flocculated calcium sulfite particles and flyash in suspension is directed to a thickener T, in a manner to be described in detail presently. The thickener underflow, which is a concentrated slurry of sodium sulfite, calcium sulfite precipitate, flyash and some sodium sulfate is directed by a line 26 to a rotary drum type filter F. Actually, in the specific example herein presented three rotary drum filters are employed, connected in parallel. The other two filters (not shown) receive slurry from branch lines 26a,26b.

A solids-free overflow from the thickener T is directed by a line 28 to a line 30, which returns the liquor to the mixer M as a regenerated extraction solution. The active ingredient of this solution is sodium sulfite and the solution has a pH of about 8–8.5. This alkaline regenerated extraction solution, when returned to the mixer M, is blended with the extract from line 15 from the scrubbers to produce the aforesaid acid primary extraction solution that serves as the scrubbing liquor for the line 14.

The filter F is a rotary drum type filter associated with a vacuumized filtrate receiver, to be described later. The filter cake is washed with water and is discharged as waste solids containing calcium sulfite precipitate, flyash and some of the mother liquor. Air is exhausted by a line 34 to draw liquor through the filter screen and the solids free filtrate, containing sodium sulfite as the active ingredient, is withdrawn from the filter by a filtrate line 36 and directed back to the mixer M via the line 30. The filtrate from the other two filters, previously mentioned, reenters the loop from lines 36a, 36b.

Although wash water from line 32 enters the loop at the filter F, it may not replace that lost or evaporated in the scrubbers, and hence some makeup water is added to the loop as indicated at line 38.

As mentioned, sodium sulfate is present in the various liquors described, but this is not an active chemical in the scrubbing process, and hence has not been emphasized in the above brief description of the basic process.

Detailed Description

FIG. 2 is a more complete diagram of the system of FIG. 1. Here a single scrubber S is shown, although branch lines for the other scrubbers shown in FIG. 1 are indicated. This discussion will be principally limited to a single scrubber.

Scrubber

Referring to FIG. 2, sulfur oxide containing waste gas, such as flue gas, enters the system through a conduit 10. The flue gas enters a scrubber indicated generally at S, which in the system shown comprises a liquid contact scrubber 12 of the venturi type, such as that shown in the U.S. application of Brady et al., Ser. No. 257,522, filed May 30, 1972 and assigned to the FMC Corporation. Briefly, the scrubber 12 comprises a square throat venturi with a full width insert or restrictor 12a in the venturi throat, giving flow passages below the venturi restriction of constant cross-sectional area. However, the process of the present invention is not limited to the specific use of the aforesaid venturi type scrubber but could employ scrubbing units or contactors in the form of packed columns, etc., as described in the aforesaid Wall et al application. It is further noted that although the flue gas may be cooled to below 500° F. in accordance with the aforesaid Wall et al application, no cyclonic separator or precipitator is provided in the flue gas line 10 entering the scrubber so that flyash originating with the flue gas source also enters the scrubber from the conduit 10.

Where the scrubber 12 is a Venturi scrubber, the throat of the scrubber receives the primary extraction solution from the line 14. By way of example, this solution, which is sprayed in the venturi throat, may comprise about 3.3 percent by weight sodium sulfite, about 3.1 percent by weight sodium bisulfite and 15% by weight sodium sulfate. These concentrations are not critical, but it is important that the ratio of sodium sulfate/sodium sulfite be high. The primary extraction solution in line 14 is acidic with a pH of about 6.2–6.7. In the scrubber 12 the primary extraction solution and the sulfur oxides in the flue gas react so that the sulfur oxides are absorbed in the primary extraction solution to form the extract. Sulfur dioxide combines with sodium sulfite ($Na_2SO_3$), as in reaction (1) previously given. The resulting extract E still contains sodium sulfite but has an increased amount of sodium bisulfite.

It is preferred that the pH of the primary extraction solution entering the scrubber does not drop below 6 (preferable pH 6.2–6.7) because if the primary extraction solution is too acidic, its $SO_2$ extraction efficiency decreases, it being noted that the solution tends to become more acid during extraction.

During the sulfur oxide extraction, if free oxygen is present in the incoming gas stream, it can also react with sodium sulfite to produce sodium sulfate, and in any event sodium sulfate is always circulated in the system. This is advantageous because under the present invention it is important to have the accumulated quantity of dissolved sodium salts in the primary extraction solution, namely the sulfite, bisulfite and sulfate of sodium, reach at least 20 percent by weight, so that the extraction solution has an ionic strength of at least 5. It was known that this high salt concentration inhibits the further conversion of sulfite to sulfate, and it is now known that the high concentration facilitates the regeneration reaction with a bleed stream of the primary extraction solution, previously described. Flyash is removed from the flue gas by inertial impaction of the dust particles on the scrubbing liquid droplets in the scrubber 12, and remains suspended in the liquid.

The gas liquid mixture enters the cyclonic separator 13 forming part of the scrubber S, wherein the liquid is separated from the gas stream by centrifugal force. The extract liquid E (which also contains flyash under the present invention) is removed through the line 15 and enters the mixer M. The sulfur oxide depleted, liquid free gas stream is exhausted from the cyclone 13 by the line 16a and is drawn through a steam tube reheater 40 by an induced draft fan 42 for delivery to a stack 44. The reheater 42 is not essential but it elevates the temperature of the moisture saturated gas so that it will readily disperse in the atmosphere. The reheater also allows the use of a mild steel fan 42 instead of a stainless steel fan. Other modes of reheating the exhaust gas can be employed.

Mixer

The acidic extract liquor in line 15 from the scrubber flows by gravity into the mixer M and contains sodium sulfite, an increased amount of sodium bisulfite, sodium sulfate and suspended flyash.

The solution in the mixer M is agitated by a rotary impeller 46 to prevent solids from settling out and plugging the lines. Also entering the mixer M is the aforesaid regenerated extraction solution from the line 30 and this solution will be alkaline, having a pH of about 8–8.5. This solution will be composed of sodium sulfite, sodium sulfate and flyash and is received from the aforementioned downstream regeneration system including the filter.

The mixer M, which combines the acid extract from line 15 with the alkaline regenerated extraction solution (pH over 8) from line 30 produces the aforesaid primary extraction solution having a pH of about 6.2–6.7.

As mentioned, primary extraction solution is pumped from the mixer by a recirculation pump 48, the delivery line 18 being divided into two streams 14 and 20 by a proportioning valve or device 22. A major portion of the primary extraction solution is directed by the line 14 to the scrubber 12. A minor portion of the primary extraction solution in the line 20 leaves the proportioning device 22 and is delivered to the regenerator R. previously mentioned and to be described presently. Flyash is withdrawn from the mixer along with the primary extraction solution and hence also enters the regenerator R via the line 20.

The valve 22 is adjusted so that the amount of bleed liquid entering the regenerator from line 20 contains only the amount of sodium bisulfite made in the scrubber by reaction (1). This is accomplished by the use of instrumentation indicated at 50. The instrumentation includes three special electrodes or probes, (1) a probe that measures the total sodium ion content in the mixer solution; (2) a probe that measures the pH of the solution and (3) an oxidation-reduction probe (ORP) that measures sulfate/sulfite ratio in the solution. These probe voltage signals are utilized to perform two functions, one of which is to adjust the bleed valve 22, based on the pH measurement from probe (2), which control signal is indicated by the dashed line 50a.

Probe electrodes of the type described are known in the art of chemical process control, and the details of such probes and associated instrumentation are not critical to the present invention.

As mentioned, since some sodium salts in the form of sodium sulfate plus a smaller amount of sodium sulfite are lost by dragout at the downstream filter F, eventually the system would be depleted of sodium salts, including sodium sulfite and would thus be unable to absorb sodium dioxide. This loss of soluble sodium salt is made up by regenerating sodium sulfite in the mixing chamber M by the addition of an active soluble sodium salt such as sodium carbonate ($Na_2CO_3$) which is delivered from a soda ash bin 52, and a screw conveyor 54 to the mixer via the line 21. The screw conveyor has a variable speed drive 55. The drive 55 is controlled by the aforesaid mixer instrumentation 50 based on measurements from the sodium ion concentration probe (1) and the pH probe (2). This instrumentation controls the admission of the sodium salt to maintain the sodium ion concentration of the mixer solution within desired limits, the control signal being indicated by the dashed line 50b.

The addition of sodium sulfate as the makeup chemical would be ineffective, because sulfate is not converted to sulfite in the system and hence the sulfite would eventually be depleted by drag out. Sodium hydroxide and sodium carbonate are the only two bulk chemicals available at a reasonable price, and because of ease of handling, the carbonate is preferred. As mentioned, it is important that the carbonate be added where the solution is acid, as in the mixer so that carbon dioxide bubbles off as in reaction (2) and the carbonate does not remain dissolved in the scrubbing liquid.

Regenerator Action

The regenerator R is of the overflow type with an agitated reaction chamber. Such chambers are per se known in the art and the engineering details thereof are not critical to the present invention. The present invention relates to the use of a regenerator of this type in the process of the invention, at a certain stage of the process and ahead of a settling chamber or thickener.

The regenerator comprises a cylindrical tank 90, the upper portion of which is surrounded by an annular overflow trough 92. The impeller of the agitator 60 is disposed about one third of the way up from the bottom of the tank 90 and is driven by a motor in the usual manner. The line 20 that feeds primary extraction solution to the regenerator, extends down into the tank 90 almost to the impeller of the agitator 60. The slaked lime bin 56 contains calcium hydroxide, $Ca(OH)_2$ and receives lime from large storage silos (not shown) via delivery lines 57 and 57a. Calcium hydroxide is delivered from the slaked lime bin 56 by means of the screw type delivery conveyor 58, having a variable speed drive 58a, to a conventional belt type weighing conveyor 59, for control of lime delivery. The lime delivery line 24 extends down to the zone of the impeller of the agitator 60.

The agitator 60 mixes the chemicals quite violently in the lower zone of the agitator chamber 90, and under these conditions there is a rapid reaction between the sodium bisulfite from the incoming primary extraction solution entering by the line 20 and the calcium hydroxide entering by the line 24. As a result of this reaction, the sodium bisulfite ($NaHSO_3$) is converted to calcium sulfite ($CaSO_3$). The pH of the regenerator solution is maintained at the preferred value of 8.3, but not less than 7.9 and not over 9.5 by instrumentation. This involves a pH meter 61 and associated controls that monitor the admission of lime by the weighing conveyor 59. The control signal is indicated by the dashed line 61a.

The calcium sulfite, being insoluble in the liquor, precipitates out and carries in the sodium salt solution in the regenerator tank to a relatively quiescent upper zone.

As mentioned, the combined reaction is as follows:

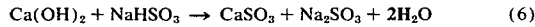
$$Ca(OH)_2 + NaHSO_3 \rightarrow CaSO_3 + Na_2SO_3 + 2H_2O \qquad (6)$$

If the total dissolved sodium salt concentration exceeds 20% by weight and if the pH in the regenerator is in the range of 7.9-9.5, as the initially small particles of calcium sulfite form, they agglomerate or flocculate to form increasingly large "fluffy" particles, usually of a diameter of over 100 microns. Due to the agitation within the regenerator R, the flyash which was also introduced by the pipe 20 agglomerates with the precipitated calcium sulfite. As the liquor slowly overflows the upper edge of the tank 90 into the overflow trough 92, the large flocculates of calcium sulfite and flyash overflow with the liquor. This gentle overflow action does not break up the large flocculates. The suspension of flocculates in the sodium salt liquor is withdrawn by the line 62, previously described, and is caused to flow by gravity alone into the eye of the thickener T. No pumps are used in the overflow line 62.

As previously mentioned, the reaction in the regenerator R initially precipitates very small particles of insoluble calcium sulfite which may be 1 micron in diameter up to 20 microns in diameter. Particles this small would settle out by gravity very slowly, and even when settled such small particles are difficult to filter. However, in the present process, particles of calcium sulfite form the aforesaid large, "fluffy" flocculates, which are readily settled or sedimented by gravity and it is therefore important that they be removed from the regenerator intact and presented to the thickener T without pumping, in the manner mentioned.

Using calcium hydroxide, the minimum residence time required in the regenerator is about 2 minutes and the maximum residence time required is 10 minutes. Additional residence time will not increase chemical utilization or in any way benefit the process. In fact, increased residence time may have some detrimental effect on the solids which are formed in the reaction. The use of calcium oxide, instead of calcium hydroxide is undesirable, because calcium oxide does not react rapidly with the sodium bisulfite in the regenerator solution, it being believed that the presence of sodium sulfite in that solution inhibits the calcium oxide reaction and may multiply the residence time of the precipitate by a factor as high as 10.

It is possible to react chemicals other than slaked or hydrated lime with the sodium bisulfite, but slaked lime reacts much more rapidly than does quick lime CaO or limestone $CaCO_3$. If other calcium chemicals were used, the regenerator size and the residence time therein would be increased significantly.

The amount of calcium salt added under control of the instrumentation 61 is sufficient to raise the pH of the solution in the lower or regenerating zone of the regenerator R to about 7.9-9.5, the preferred pH being 8.3. The pH is not permitted to exceed 9.5 because calcium utilization begins to drop off above this pH. If too much calcium hydroxide is added and the pH allowed to increase to about 12, the calcium hydroxide does not react and is carried through the thickener T to be filtered out at the rotary filter F, and hence is wasted. In the present process the calcium is used stoichiometrically and there is no waste of the calcium hydroxide.

Remainder of the Process

At the thickener T, the large flocculates entering from line 62 settle by gravity to form a concentrated slurry of the calcium sulfite precipitate, flyash and some sodium salt solution. The slurry is removed from a bottom well of the thickener by a thickener underflow pump 64 for delivery to the line 26 leading to the filter F to be described presently. Instrumentation indicated at 65 measures the specific gravity of the slurry. The pump 64 is an air operated, positive displacement diaphram pump, the frequency of which can be varied by a modulator 66 to adjust the flow rate to the rotary drum filters F. The specific gravity instrument 65 provides a signal 65a and the pump modulator 66 provides a signal 66a for control of the filter wash-back, as will be described. Overflow from the thickener T, which contains sodium sulfite and sodium sulfate in solution, but no precipitates or flyash, is removed by the line 28 and directed to a holding tank HT. Filtrate also enters the holding tank from the line 36. The holding tank solution contains the aforesaid regenerated extraction solution that eventually enters the mixer M by the line 30, as previously described.

An agitator 68 is provided in the return liquor holding tank HT to prevent any solids which might have entered from the thickener or from a rotary drum filter F from settling to the bottom of the tank. In normal operation the agitator 68 is not required, but it is provided as a safety feature because it is possible that a filter cloth of one of the rotary drum filters F may rupture, which will thereupon pass solids into the filtrate return line 36 and into the holding tank HT. The agitator 68 will prevent these solids from settling out in the tank.

As an additional safety feature, a polishing filter PF is interposed between the holding tank HT and the mixer M. A return liquor pump 70 withdraws regenerated extraction solution from the holding tank HT and directs it by a line 72 to the polishing filter PF. The polishing filter PF is also a fabric-type filter which has a screen indicated diagramatically at 74, and which removes solids being pumped through the filter until the screen becomes plugged to the point that no further liquid can be pumped through it. When plugging occurs, a backwash system is placed into action wherein backwash water from a water source 76, under control of a valve 78, washes the filter screen 74 in reverse and returns the backwash slurry to the rotary filters F by a line 80. The line 80 is shown in dotted lines to indicate that it is not in use during normal operation. In this manner, any solids which might have found their way through to the return liquor holding tank HT are ultimately returned to the rotary drum filters F and hence are removed from the solution along with the regular waste solids. The advantage of this feature is that without it, in case a filter cloth were ruptured in a rotary filter F, calcium sulfites are not returned to the scrubber where they could cause scale formation.

Makeup Water

As has previously been mentioned, some water is lost in the system by evaporation and in the scrubber S and carried out the exhaust line 16a as a vapor. Although some wash water is added to the system at the rotary filter F from the line 32, this may be insufficient to maintain the water level in the system. Accordingly, the makeup water line 38, previously described, is located at the holding tank HT. This line is provided with a control valve 82 which is operated by a liquid level device in the holding tank HT, such as a float system indicated schematically at 84. Maintenance of the liquid in the holding tank at a predetermined level automatically compensates for water lost in the system and not made up elsewhere.

Thickener Considerations

The thickener T is, in reality, a settling tank which causes the flocculated calcium sulfite precipitate and flyash in the solution overflowing from the regenerator R to settle to the bottom, thereby forming an increased density slurry of precipitate, sodium salt solution and flyash in the lower portion of the thickener.

The thickener is illustrated diagramatically in FIG. 2, but it is a type well known for use in sewage treatment plants for primary or secondary settling operations with a water and suspended solids influent. The thickener T is a large diameter, low height cylindrical tank 94 having a shallow conical bottom 96 and a central sump or well 98. A slowly rotating rake 100 works the precipitate and flyash down the conical bottom 96 of the thickener to a sump or well 98 for withdrawal as a concentrated slurry by the thickener underflow pump 64. It has been found that once the aforesaid slurry is formed in the thickener, the slurry can be pumped to the filters without deleterious effects on the filtering action of the calcium sulfite precipitate.

The thickener has a cylindrical baffle 104 and an annular partition 106 for maintaining quiesence at the overflow trough 102. Solids free sodium salt solution moves upwardly in the thickener outside the baffle 104 at a rate of about 0.4 gal./min./sq. ft. of thickener area, to reach the upper portion of the thickener as a source of solids-free regenerated extraction solution. This sodium sulfite, sodium sulfate solution overflows the top of the thickener tank 94 into a trough 102, from which it is returned to the system via the line 28 leading to the holding tank HT.

Filter

The increased density slurry of calcium sulfite precipitate in a sodium sulfite, sodium sulfate liquor, along with flyash carried through the system to the thickener well 98 is pumped by the thickener underflow pump 64 through the line 26 to one of the rotary filter units indicated generally at F. Each unit comprises an influent tank 110 in which is partially immersed a water washed, fabric covered rotary filter drum 112 upon which the filter cake forms. The filtrate is withdrawn from the interior of the drum, usually at one or both ends of the drum. Rotary filters of this type are well known in the chemical processing arts and the details thereof are not critical to the present invention.

The moist filter cake of calcium sulfite $CaSO_3$ and flyash is formed on the outer surface of the filter drum 112, is scraped off in a conventional manner, and directed to a distributing conveyor 114 for disposal as waste solids. An agitator 116 prevents solids from settling in the filter tank 110.

The filtrate is sucked through the filter cloth from the interior of the filter-drum 112 by a line 118 and enters a vacuumized filtrate receiving tank 120. This tank is connected by a line 122 to a filter vacuum pump 124, which separates air from the filtrate and exhausts through the line 34 to a silencer (not shown). The filtrate is pumped from the tank 120 by a filtrate return pump 126 to the filtrate return line 36. Thus, regenerated extraction solution having a pH of 8–9 (line 36) joins the regenerated extraction solution from the thickener overflow (line 28) and enters the holding tank HT, as previously described. Neither of these solutions will ordinarily include any significant amount of calcium sulfite precipitate or flyash.

A water wash system is provided on the filter drum in order to wash some of the sodium salts being dragged out with the waste solids back into the tank 110. Only a controlled amount of salts is permitted to leave the filter, as will be explained presently. To this end, the water source 32 is controlled by a valve 130 which is operated in accordance with a master control unit indicated diagramatically at 132 for controlling the amount of solution washed back into the filter tank 110.

Solution Control

During the scrubbing process, some of the sodium sulfite in the scrubbing liquor oxidizes to sodium sulfate, and hence this increase in sodium sulfate represents a corresponding depletion of the active chemical, sodium sulfite. The reaction of oxidation is shown as follows:

$$2Na_2SO_3 + O_2 \rightarrow 2Na_2SO_4 \qquad (7)$$

Sodium sulfate, once formed, does not react with sulfur dioxide and is therefore an "inert" chemical in this system. To maintain a constant sodium sulfate concentration in solution and thus prevent sodium sulfate from building up at the expense of sodium sulfite, some sodium sulfate is rejected from the system continuously. Because the rotary drum filter is filtering a liquid which contains sodium sulfate, sodium sulfite, and some sodium bisulfite, this is the preferred location for rejection of sodium sulfate. The loss of sodium from the system because of this rejection is made up by the addition of sodium carbonate in the mixer M, which replenishes the sodium salts therein in the form of sodium sulfite. The moist waste solids are allowed to carry some sodium salts with them as they are discharged to the conveyor 114. To minimize loss of sodium sulfite, which is the reactive chemical in the system, the ratio of sodium sulfate in solution to sodium sulfite in solution is very high (in favor of sodium sulfate). Therefore as liquor is rejected with the waste solids, it will be predominantly sodium sulfate. For example, the present process preferably uses a scrubbing liquid which is approximately 15% by weight sodium sulfate, 3.3% by weight sodium sulfite and 3.1% by weight sodium bisulfite in the scrubbing system.

The filter drum wash system is operated to limit the sodium sulfate loss to its rate of formation in reaction (7). This is accomplished by adjusting the wash water valve 130 to wash back exactly enough liquor into the filter tank 110 to maintain the concentration in the mixer M at the selected value. The instrumentation principle is as follows: It is assumed that the amount of liquor rejected from the filter F in the filter cake is proportional to the amount of solids in the cake. The latter amount can be treated as a function of the slurry delivery rate of the thickener underflow pump 64 (signal 66a) and the slurry density (signal 65a). The oxidation-reduction probe in the mixer tank instrumentation 50 provides a signal 50c that represents the sulfate/sulfite ratio in the mixer M. These signals 50c, 65a and 66a are received by the wash back valve control unit 132 to adjust the wash back valve 130 so that a sufficient amount of liquor is washed back into the filter tank to maintain the composition in the mixer M at the desired value. A very small amount of sodium sulfite is dragged out with the waste solids, but this is made up at the mixer M, as described.

Flyash Filter-Aid

As mentioned, it is important that no calcium salts be returned in the filtrate line 24 to the mixer 20 for ultimate introduction to the scrubber 12 along with the primary extracting solution via lines 30 and 14. This is because calcium salt precipitates form scale deposits that tend to plug and interfere with the efficiency of the scrubber 12. Even when the large size calcium sulfite flocculates are delivered to the filter 90 under the present invention, without the addition of a filter aid such as flyash, the filtered precipitate is thixotropic and tends to fluidize upon handling. However, when flyash is incorporated into the slurry entering the filter, it facilitates a more complete dewatering of the waste solids. It is known in the filtration art to add diatomaceous earth or similar materials as filter-aids but since the present process is one wherein relatively large volumes of solids are filtered, the use of such filter-aids is expensive. However, and as mentioned, since it has been found that flyash, such as that present in the flue gas stream, provides an excellent filter-aid, the flyash is not removed from the flue gas entering the scrubber 12, nor in the scrubber itself, but rather the flyash is carried through the scrubber, mixer M, regenerator R and thickener T to the filter F as an excellent filter-aid material. Of course, since the flyash is initially present in the gas stream entering the system, its use as a filter-aid adds nothing to the cost of operation. Thus, no precipitator is installed in the flue gas line 10 entering the scrubber 12, and if such precipitator or the like has been installed, it must be operated at low efficiency to allow much of the flyash to enter the scrubber, where it is separated out from the gas stream. Also, no attempt is made to remove flyash entrained in the sulfur oxide enriched extract E formed in the scrubber, nor is a flyash removal system incorporated in the system between the scrubber and the rotary filters F. More specifically, it has been found that the inlet flyash grain loading in the gas stream in line 10, directing the flue gas to the scrubber, should be at least 0.3 grains per standard dry cubic foot of gas.

In installations wherein the contaminated gas stream contains no flyash or particulate matter, under the present invention, flyash or other filter-aid should be added into the reactor R so that it becomes incorporated into the calcium sulfite precipitate before reaching the rotary filters F. The added particulates also enhance the sedimentation rate of the calcium sulfite precipitate in the thickener T.

With the flyash thus entering the rotary filters F, calcium sulfite precipitate mixed with flyash collects on the outer surface of the filter drum 112, to be disposed of as waste solids.

Process Example

The scrubber feed liquor line 14 has four branch lines 14a–14d after leaving the recirculation pump 48 to feed each of the four scrubbers Sa–Sd individually. Scrubber underflow lines 15a–15d from each of the four scrubbers return the extract to the recirculation or mixer tank M through line 15 by a gravity feed. Of course the lines 15a–15d could enter the tank M individually. In the present example, two of the four scrubbers treat approximately 80,000 acfm of flue gas each. The other two scrubbers treat approximately 40,000 acfm of flue gas each. The scrubber feed liquor flow rate through those two of the branch lines 14a–14d which lead to the 80,000 cfm scrubbers is approximately 850 gpm each. The scrubber feed liquor rate through the other branch lines which lead to the two 40,000 cfm scrubbers is approximately 450 gpm each.

The inlet temperature of the contaminated gas stream (line 10) to all scrubbers is approximately 400° F. The outlet temperature of the gas stream from the scrubbers prior to reheat (lines 16a–16d) is approximately 150° F. The individual scrubber reheaters 40 elevate the gas temperature to approximately 210° F before being exhausted into the induced draft fans 42 and the stacks. Each scrubber has its own reheater 40 and its own induced draft fan 42.

The scrubbers all operate at a differential pressure of approximately 15 inch water gauge between the inlet flange for the venturi 12 and the discharge from the cyclone 13 ahead of the reheater 40.

The scrubbing liquid in the mixer M contains approximately 3.3% (wt.) sodium sulfite, 3.1% (wt.) sodium bisulfite, and 15% (wt.) sodium sulfate, and has a pH of approximately 6.3. The scrubber underflow extract E is gravity fed back to the mixer or recirculation tank M by line 15. It has a slight but an almost unnoticeable pH decrease and chemical composition change from the primary extraction or scrubber feed liquor in line 14 because the quantity of sulfur dioxide absorbed, compared with the quantity of available sodium sulfite in the primary extraction solution or scrubbing liquor is small.

The inlet concentration of sulfur dioxide in the flue gas in line 10 is approximately 1800 ppm (volume) and the outlet concentration of each of the lines 16a–16d varies from 180 ppm up to as high as 400 ppm depending upon the exact ratio of sodium sulfite to sodium bisulfite in the scrubbing solution.

The recirculation pump 48 pumps a total of approximately 2,994 gpm to line 18. 2,600 gpm of this is then distributed by line 14 to the four scrubbers. Approximately 394 gpm is diverted through the control valve 22 as liquor in line 20 for regeneration.

The mixer or recirculation tank M is approximately 14 feet in diameter and 7 feet deep. The regenerator tank 90 is approximately 8 feet in diameter and 8 feet deep. The recirculation tank M has a 5 HP agitator 46 and the lime reactor R also has a 5 HP agitator. The lime is stored in two lime storage silos 56 feet tall and 15 feet in diameter, and fed by lines 57, 57a to the smaller bin or lime surge hopper 56, which is 5 feet × 5 feet square and 12½ feet tall. The lime is fed by a 6 inch diameter screw feeder 58 to the belt feeder 59 which continuously weighs the lime as it is fed.

The overflow from the regenerator R in the line 62 of approximately 400 gpm is fed to the thickener T, which is 35 feet in diameter, 6 feet deep along the straight side walls of the tank 94 and 8½ feet deep to its conical bottom. The thickener T is equipped with a low speed rake 100 to rake the settled solids to the center withdrawal sump 98. The thickener overflow discharges about 132 gpm via line 28 to a 7 feet diameter by 7 feet deep return liquor holding tank HT, equipped with a 1 Hp agitator 68.

The return liquor pump 70 is capable of pumping a flow rate equivalent to the highest flow rate which will ever occur in the liquor sent to regeneration by the line 20. The polishing filter PF is designed to handle the same flow rate. Polishing filters vary so much in design that dimensions of the polishing filter are meaningless, but the flow rate for which this equipment item is sized is approximately 500 gpm maximum. The polishing filter PF will remove all particulate matter down to as small as 5 microns in diameter.

The thickener underflow is pumped at about 268 gpm to the line 26 by the air operated diaphragm pump 64 whose frequency can be varied or modulated by the unit 60 to adjust the rate of slurry delivery to the rotary drum filters F. Three rotary drum filters F are used in parallel and their drums are 6 feet in diameter by 8 feet in length. The filtrate receivers 120 are each approximately 3 feet in diameter and 4 feet tall. The vacuum pumps 124 are approximately 25 HP each.

For this example, the consumption and production rates from the process are as follows:

| | | |
|---|---|---|
| Soda Ash Feed Rate (line 21) | = | 587 lbs./hr. |
| Hydrated Lime Feed Rate (line 24) | = | 2,839 lbs./hr. |
| Total Makeup Water Added (incl. filterwash (lines 38 and 32) | = | 62,600 lbs./hr. |
| Moist Waste Solids Production Rate | = | 16,140 lbs./hr. |
| Total Inlet Flue Gas Processed | = | 908,336 lbs./hr. |
| Total $CaSO_3 \cdot 2H_2O$ Produced (waste Solids) | = | 5,386 lbs./hr. |
| Total Flyash Collected (waste solids) | = | 2,688 lbs./hr. |
| Total Flyash Not Collected | = | 74 lbs./hr. |
| Total $SO_2$ Collected (Scrubbers) | = | 2,564 lbs./hr. |
| Total $SO_2$ Not Collected | = | 178 lbs./hr. |

Because the solutions of the scrubbing system are acidic, the scrubbing portion of the system is normally built of corrosion-resistant materials including stainless steel and fiberglass. The scrubbers S are normally built of stainless steel. The recirculation tank M is built of stainless steel or fiberglass. The recirculation pump 48 is built of either stainless steel or rubber-lined steel. The associated piping is all rubber-lined or stainless steel. Once the solution is discharged into the reactor R, mild steel can be used for the remainder of the process. The pH is immediately raised to above 8.0 when hydrated lime is added to the reactor, and mild steel tanks and pipes will suffice so long as the pH of the solutions is greater than 7. This, of course, results in significant materials cost savings in the regeneration portion of the scrubbing system. All of the remaining equipment can be formed of mild steel up through and including the return liquor holding tank HT and the polishing filter PF which feed the slightly alkaline solution back to the tank M.

This completes a detailed description of the process of the present invention. Although the best mode contemplated for carrying out the present invention has been herein shown and described, it will be apparent that modification and variation may be made without departing from what is regarded to be the subject matter of the invention.

We claim:

1. In a process for removing gaseous sulfur oxides from a gas stream by means of a circulating aqueous acidic extracting solution which contains sodium sulfate, sodium sulfite, and sodium bisulfite wherein said gas stream is contacted with the circulating extracting solution to form a liquid extract having an increased sodium bisulfite content, wherein at least a portion of the sodium bisulfite content of said extract is regenerated to sodium sulfite by the addition of calcium hydroxide so as to form an aqueous acidic slurry containing dissolved sodium sulfite and calcium sulfite, wherein the solid calcium sulfite is separated from said solution so as to produce a regenerated aqueous solution having a reduced bisulfite content, and wherein the regenerated aqueous solution is commingled with the circulating extracting solution, the improvement comprising:

withdrawing a portion of said extract from circulation and forming an agitated liquid column which includes said withdrawn portion and comprises an aqueous solution of sodium bisulfite, sodium sulfite, and sodium sulfate, said column having ascending zones of decreasing turbulence;

introducing calcium hydroxide into said aqueous solution so as to maintain the pH of the agitated liquid column at a value of at least about 7.9 to about 9.5 and to produce a floc containing calcium sulfite;

floating said floc to the upper surface of said agitated liquid column;

removing said floc as an overflow from said liquid column and transporting said floc substantially intact to a thickening zone;

permitting said floc to settle by gravity in said thickening zone so as to produce a thickened slurry containing solid calcium sulfite;

withdrawing a first aqueous solution having a reduced sodium bisulfite content as overflow from the thickening zone;

collecting said thickened slurry from the thickening zone as underflow;

filtering said thickened slurry and recovering as filtrate a second aqueous solution having a reduced sodium bisulfite content; and combining said first and second aqueous solutions having a reduced sodium bisulfite content to produce said regenerated aqueous solution.

2. The process in accordance with claim 1 wherein said combined first and second aqueous solutions are filtered prior to being commingled with said circulating extracting solution.

3. The process in accordance with claim 1 wherein a flyash is introduced in said agitated liquid column as a filtering aid and wherein said produced floc contains said filtering aid.

4. The process in accordance with claim 1 wherein flyash present in said gas stream is removed therefrom by said circulating extracting solution and is introduced into said agitated liquid column by said extract.

5. The process in accordance with claim 1 wherein the pH of said agitated liquid column is about 8.3.

* * * * *